US011944232B2

(12) United States Patent
Diamanti et al.

(10) Patent No.: US 11,944,232 B2
(45) Date of Patent: Apr. 2, 2024

(54) APPARATUS FOR MAKING A BEVERAGE, COMPRISING AN IMAGE ACQUISITION DEVICE

(71) Applicant: CAFFITALY SYSTEM S.P.A., Gaggio Montano (IT)

(72) Inventors: Maurizio Diamanti, Castel di Casio (IT); Ivan Cati, Camugnano (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 630 days.

(21) Appl. No.: 17/258,608

(22) PCT Filed: Jul. 11, 2019

(86) PCT No.: PCT/IB2019/055926
§ 371 (c)(1),
(2) Date: Jan. 7, 2021

(87) PCT Pub. No.: WO2020/012409
PCT Pub. Date: Jan. 16, 2020

(65) Prior Publication Data
US 2021/0267407 A1   Sep. 2, 2021

(30) Foreign Application Priority Data

Jul. 13, 2018   (IT) .................. 102018000007178

(51) Int. Cl.
*A47J 31/44*   (2006.01)
*A47J 31/36*   (2006.01)
(Continued)

(52) U.S. Cl.
CPC ....... *A47J 31/4492* (2013.01); *A47J 31/3676* (2013.01); *A47J 31/60* (2013.01);
(Continued)

(58) Field of Classification Search
CPC .... A47J 31/4492; A47J 31/3676; A47J 31/60; H05B 3/86; H05B 2203/008; H05B 2203/013
(Continued)

(56) References Cited

U.S. PATENT DOCUMENTS 7,645,961 B2   1/2010 Fernandez
9,100,996 B2   8/2015 Lisinski et al.
(Continued)

FOREIGN PATENT DOCUMENTS

CH   712822 A1   2/2018
CN   2689639 Y   3/2005
(Continued)

*Primary Examiner* — Omar Flores Sanchez
(74) *Attorney, Agent, or Firm* — Pearne & Gordon LLP; Michelle E. Tochtrop

(57) ABSTRACT

An apparatus for making a beverage including an infusion chamber for a capsule containing a food substance, an insertion opening for inserting the capsule into the apparatus, a transfer channel for transferring the capsule from the insertion opening to the infusion chamber, an image acquisition device to acquire at least one image of a portion of the capsule. The image acquisition device includes an optical sensor facing an image capture zone in which, in use, said capsule is located or passes. A viewing window, made of transparent material, is interposed between the optical sensor and the image capture zone. A heating element for heating the viewing window is applied to, or incorporated in, the viewing window.

13 Claims, 4 Drawing Sheets

(51) Int. Cl.
*A47J 31/60* (2006.01)
*G02B 27/00* (2006.01)
*H05B 3/86* (2006.01)

(52) U.S. Cl.
CPC ........... *G02B 27/0006* (2013.01); *H05B 3/86* (2013.01); *H05B 2203/008* (2013.01); *H05B 2203/013* (2013.01)

(58) Field of Classification Search
USPC ......................................................... 99/285
See application file for complete search history.

(56) References Cited

U.S. PATENT DOCUMENTS

| | | | |
|---|---|---|---|
| 9,277,597 | B2 | 3/2016 | Phan et al. |
| 9,526,130 | B2 | 12/2016 | Lisinski et al. |
| 10,143,329 | B2 | 12/2018 | Casiddu |
| 10,575,676 | B2 | 3/2020 | Rubin |
| 10,772,460 | B2 | 9/2020 | Accursi |
| 10,820,744 | B2 | 11/2020 | Rubin et al. |
| 10,820,745 | B2 | 11/2020 | Zwicker et al. |
| 10,953,814 | B2 | 3/2021 | Bulgajewski et al. |
| 2006/0108352 | A1 | 5/2006 | Fernandez |
| 2006/0226228 | A1 | 10/2006 | Gagne et al. |
| 2009/0201340 | A1 | 8/2009 | Silverbrook |
| 2012/0000896 | A1 | 1/2012 | Phan et al. |
| 2013/0213949 | A1 | 8/2013 | Lisinski et al. |
| 2013/0220992 | A1 | 8/2013 | Lisinski et al. |
| 2016/0174752 | A1 | 6/2016 | Casiddu |
| 2017/0164780 | A1 | 6/2017 | Hesselbrock et al. |
| 2017/0196397 | A1 | 7/2017 | Flick et al. |
| 2017/0303733 | A1 | 10/2017 | Balkau |
| 2017/0325620 | A1 | 11/2017 | Rubin et al. |
| 2017/0325626 | A1* | 11/2017 | Rubin ................. A47J 31/3633 |
| 2018/0334075 | A1 | 11/2018 | Frank et al. |
| 2018/0344075 | A1 | 12/2018 | Zwicker et al. |
| 2019/0021543 | A1 | 1/2019 | Accursi |
| 2020/0093316 | A1* | 3/2020 | Hilckmann ......... A47J 31/3623 |
| 2020/0154937 | A1 | 5/2020 | Accursi |
| 2021/0076867 | A1* | 3/2021 | Hay .................... A47J 31/0668 |

FOREIGN PATENT DOCUMENTS

| | | |
|---|---|---|
| CN | 102450093 A | 5/2012 |
| CN | 102812776 A | 12/2012 |
| CN | 103356005 A | 10/2013 |
| CN | 204877180 | 12/2015 |
| CN | 105276485 A | 1/2016 |
| CN | 106240470 A | 12/2016 |
| CN | 106998932 A | 8/2017 |
| CN | 107072424 A | 8/2017 |
| CN | 107205571 A | 9/2017 |
| CN | 206621265 U | 11/2017 |
| CN | 208485807 | 2/2019 |
| EP | 1626583 | 2/2006 |
| EP | 3175745 A1 | 6/2015 |
| EP | 3028608 A1 | 6/2016 |
| EP | 3095361 A1 | 11/2016 |
| EP | 3338601 A1 | 6/2018 |
| IT | 102017000060684 A1 | 12/2018 |
| JP | H10275672 | 10/1998 |
| JP | 2002134254 | 5/2002 |
| JP | 2006029650 A | 2/2006 |
| JP | 2010251230 | 11/2010 |
| KR | 100817856 | 3/2008 |
| KR | 20170030489 A | 3/2017 |
| WO | 2014195842 A2 | 12/2014 |
| WO | 2015019248 A1 | 2/2015 |
| WO | 2015019249 A1 | 2/2015 |
| WO | 2016005352 A1 | 1/2016 |
| WO | 2017134544 A1 | 8/2017 |
| WO | 2017151348 | 9/2017 |
| WO | 2018033312 A1 | 2/2018 |
| WO | 2018220510 A1 | 12/2018 |

\* cited by examiner

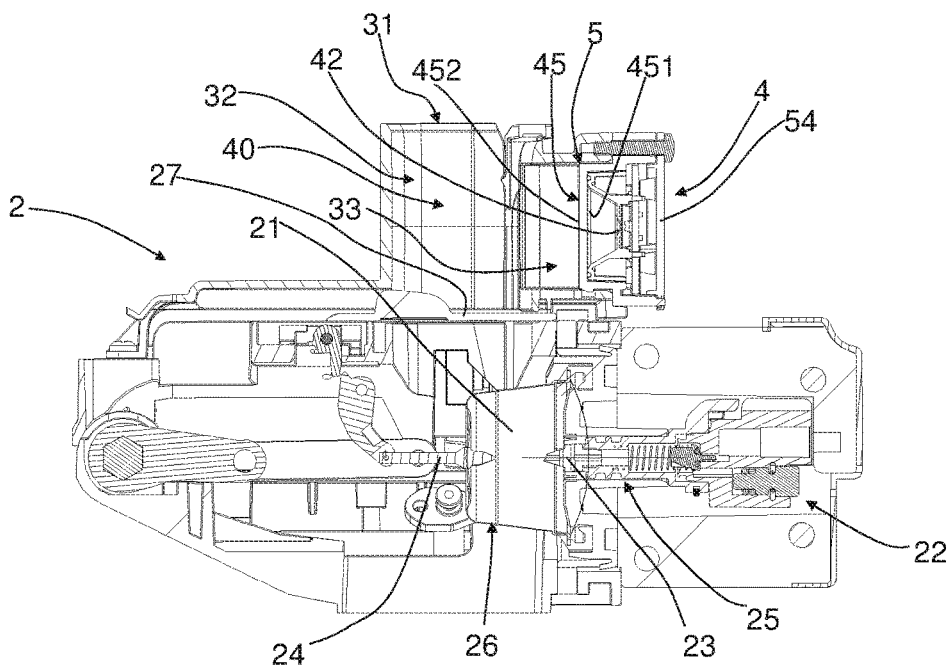
FIG. 4
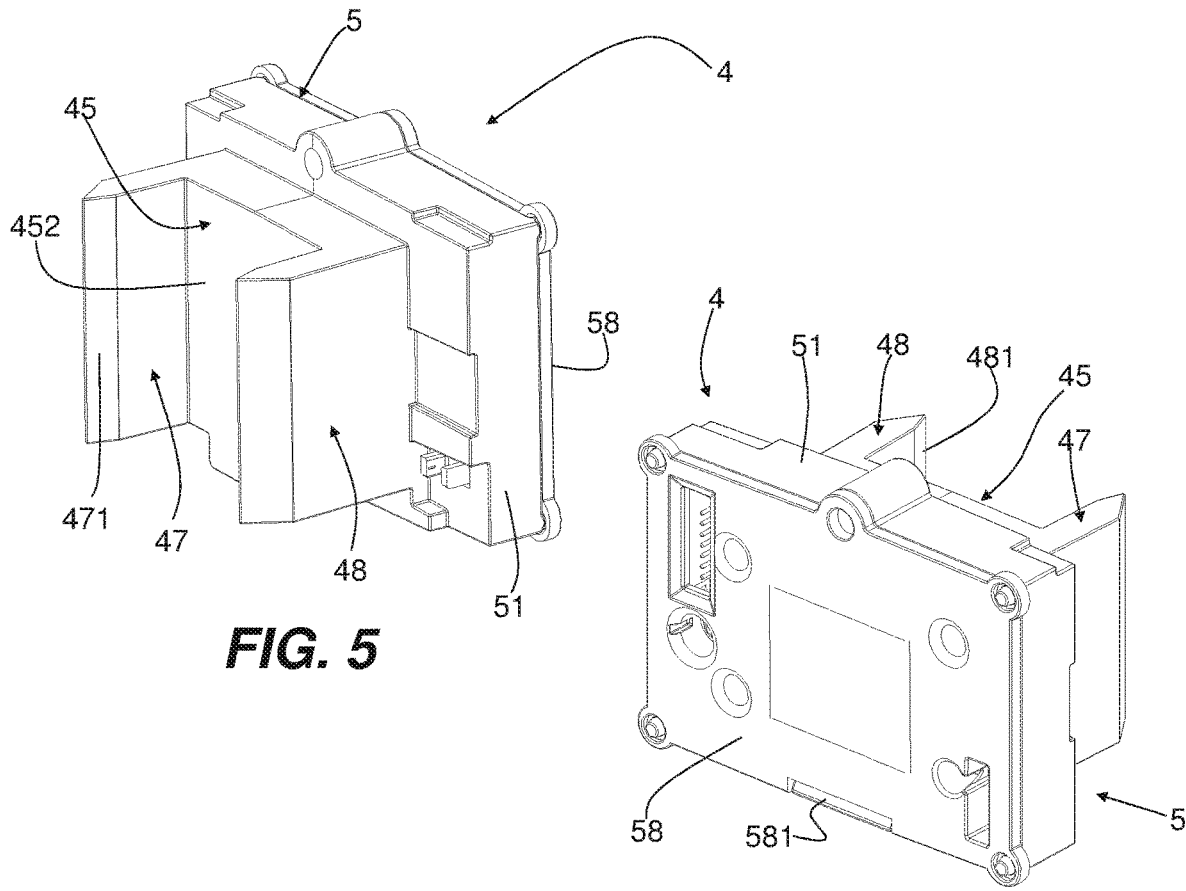
FIG. 5
FIG. 6

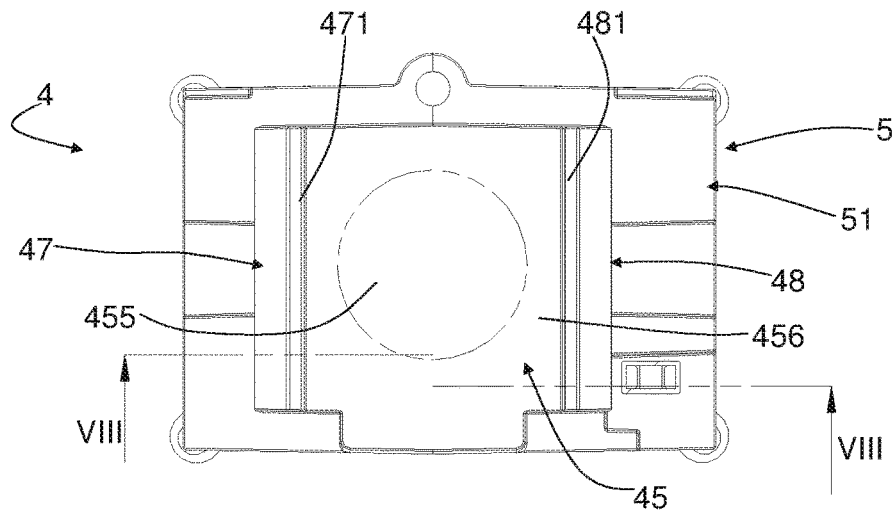
FIG. 7
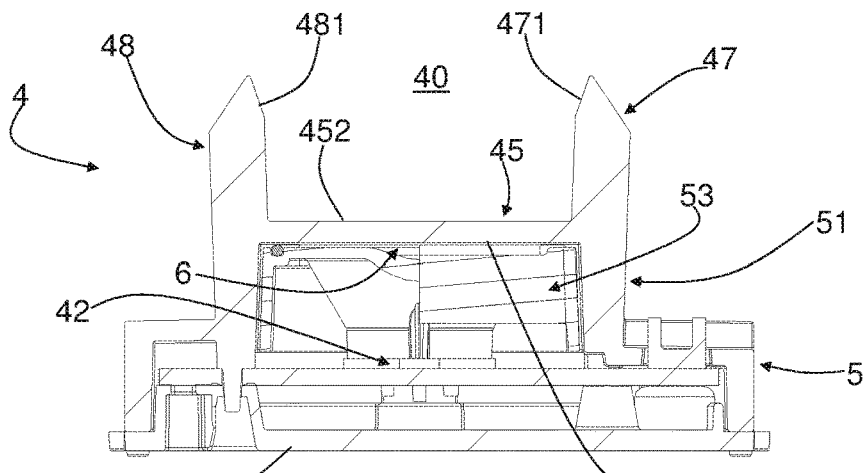
FIG. 8
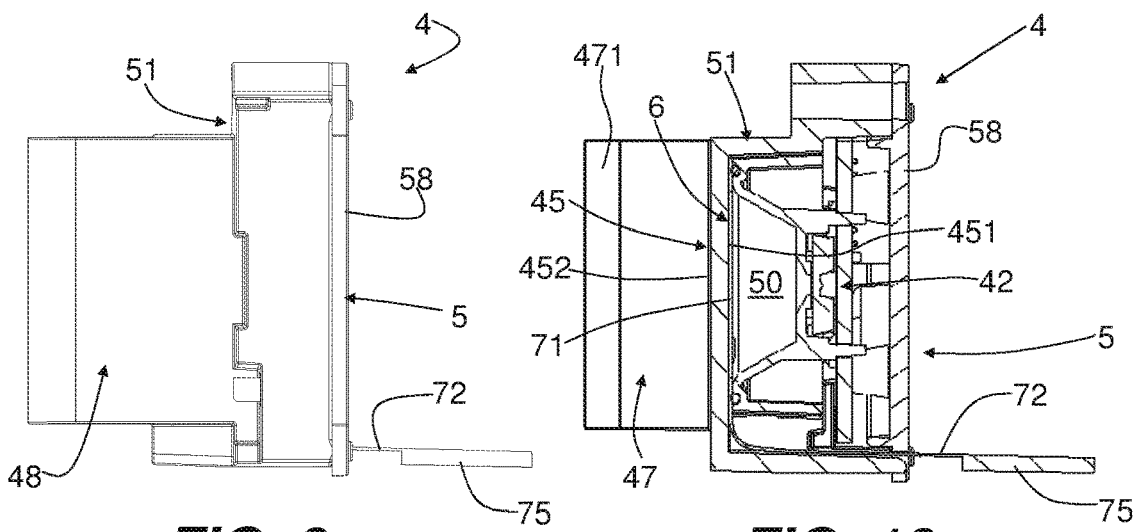
FIG. 9   FIG. 10

APPARATUS FOR MAKING A BEVERAGE, COMPRISING AN IMAGE ACQUISITION DEVICE

This invention relates to the sector of beverage making apparatuses. In particular, this invention relates to an apparatus for making a beverage using a capsule containing a food substance, the apparatus comprising an image acquisition device to acquire at least one image from a portion of the capsule to use.

There are currently several known apparatuses capable of making beverages, generally comprising an infusion unit with an integrated infusion chamber into which, in use, a capsule containing a food substance can be inserted.

The infusion unit in turn comprises a first part and a second part which are movable at least relative to each other between a home position, in which the two parts are spaced apart from each other and the infusion chamber is open to allow the capsule to be placed therein, and an infusion position, in which the two parts are coupled to each other and close an infusion chamber. There are also beverage making means for making water (in particular, pressurised hot water) circulate through the capsule contained in the closed infusion chamber, thereby causing the beverage to be made, and for dispensing the beverage out of the apparatus.

Apparatuses capable of detecting the type of capsule fed into the apparatus are already known in the sector. The apparatus adopts the infusion and dispensing parameters (such as the temperature and pressure of the water fed to the capsule) best suited to the type of capsule.

One particular technology currently used for that purpose involves an optical recognition of the capsule by means of an image acquisition device which is positioned upstream of the infusion chamber or in the infusion chamber itself. The image acquisition device is capable of reading a bar code or a QR-code or another recognisable code which is present on the capsule. However, the currently known embodiments of this technology have several drawbacks.

In particular, the image acquisition device is positioned in a part of the apparatus in which water vapour or moist air may be present, coming from the infusion chamber and/or from a collection drawer for used capsules. When in contact with a cold surface, the water in the gaseous phase can cause water condensation and misting on the surface itself. In particular, this occurs on a viewing window, made of transparent material, which separates the optical sensor of the image acquisition device from the region in which the capsule to be recognised passes. The lower the room temperature, the greater this drawback.

Water condensation and misting on the viewing window of the image acquisition device can hinder or even prevent the operation of the device and can give rise to reading errors of a lesser or greater severity.

It is therefore necessary to counteract the formation of water condensation or misting which can interfere with the correct operation of the image acquisition device.

In some known solutions, a fan is present to create a forced airflow on the viewing window (for example, see European patent application No. EP3175745A1), or the viewing window is positioned in such a way as to be easily accessible and cleanable by a user. However, the known solutions are not entirely satisfactory and effective, and entail technical complications or the need for manual intervention by the user.

In this context, the technical purpose which forms the basis of this invention is to produce an apparatus for making a beverage that enables the above mentioned drawback to be overcome, or at least reduced, or that offers an alternative solution to the current known solutions.

The technical purpose and the aims indicated above are substantially achieved by an apparatus for making a beverage in accordance with claim 1.

Particular embodiments of this invention are defined in the corresponding dependent claims.

According to one aspect of this invention, the apparatus for making a beverage comprises a heating element that is applied to the viewing window of the image acquisition device or is incorporated in the viewing window itself. The heating element is an electrical resistor-type heater and is connectable to an electricity supply, thus it heats the viewing window during use of the apparatus.

This is useful for heating the viewing window directly and efficiently, in order to prevent, or at least reduce, the formation of water condensation thereon. Indeed, the heat produced by the heating element is transferred by conduction to the viewing window, which is consequently heated.

In one embodiment, the heating element comprises an electrical conductor which forms a heating electrical resistor and which is positioned at the peripheral region of the viewing window, therefore the electrical conductor is not on the optical path between the optical sensor and the image capture zone. This is useful for preventing the operation of the image acquisition device from being affected. In particular, the electrical conductor substantially forms a ring which surrounds a central region of the viewing window.

In one embodiment, the heating element comprises a thin sheet and an electrical conductor which forms the heating electrical resistor. The electrical conductor is applied to the thin sheet or is incorporated in the thin sheet, which is in turn applied to the viewing window or incorporated in the viewing window. The heating element is therefore a slender, non-bulky article which can be easily handled and assembled with the other parts during the making of the image acquisition device and, moreover, does not take up significant space in the apparatus. The thin sheet is, for instance, made from transparent material.

Further features and the advantages of this invention will become more apparent from the following detailed description of a preferred, non-limiting embodiment of an apparatus for making a beverage which includes an image acquisition device. Reference shall be made to the accompanying drawings, in which:

FIG. 4 is a longitudinal sectional view of the inner unit shown in FIG. 3;

FIG. 5 is a perspective front view of an assembly comprising an image acquisition device, with this assembly forming part of the inner unit shown in FIG. 3 and being shown alone and removed from the apparatus;

FIG. 6 is a perspective rear view of the assembly shown in FIG. 5;

FIG. 7 is a front view of the assembly shown in FIG. 5;

FIG. 8 is a sectional view of the assembly shown in FIG. 5, sectioned along lines VIII-VIII shown in FIG. 7;

FIG. 9 is a rear view of the assembly shown in FIG. 5;

FIG. 10 is a longitudinal sectional, side view of the assembly shown in FIG. 5;

Figure 1:
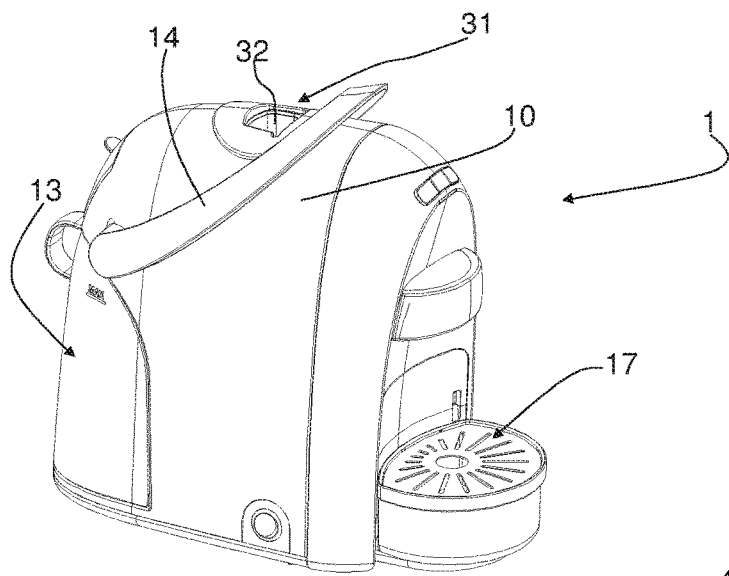
FIG. 1 is a perspective view of an apparatus for making a beverage in accordance with this invention.

Referring to the figures enclosed, an apparatus for making a beverage in accordance with this invention has been labelled with reference number 1 in its entirety. To make a beverage, the apparatus 1 uses a capsule (not shown), in particular a disposable capsule, containing a food substance, such as coffee powder.

The apparatus 1 is shown schematically and in particular some details, relating to aspects known per se that are not material to the understanding of this invention, have been omitted from the figures.

The apparatus 1 has a shell 10, or outer casing, which encloses and protects the inner components of the apparatus 1 itself. The inner components are described below.

First, the apparatus 1 comprises an infusion unit 2 in which an infusion chamber 21, which is suitable for receiving the capsule containing the food substance, is made.

The infusion chamber 21 is associated with beverage making means, which are not illustrated in detail in the figures as they can be made according to known methods and are not directly linked to the innovative aspects of this invention. In use, the beverage making means are capable of making water (in particular, hot water) circulate through the capsule contained in the closed infusion chamber 21, thereby causing the beverage to be made, and of dispensing the made beverage out of the apparatus 1.

The beverage making means comprise a heater 22 for heating water, a feeding circuit for feeding water (which is or is not pressurised) to the infusion chamber 21, and a dispensing conduit for dispensing the made beverage outwards. The heater 22 comprises, for instance, an electric resistor which heats the water by means of Joule effect, that is, by resistive heating.

The water to be heated is taken from a tank 13 and the water feeding circuit comprises a pump.

The beverage making means can comprise first piercing means 23 to make a first hole in the capsule, through which water is fed into the capsule itself, and second piercing means 24 to make a second hole through which the beverage is allowed to flow out of the capsule.

As the details of the beverage making means are not part of the innovative aspects of this invention and in themselves may be similar to the known ones, these are here described only briefly.

Figure 2:
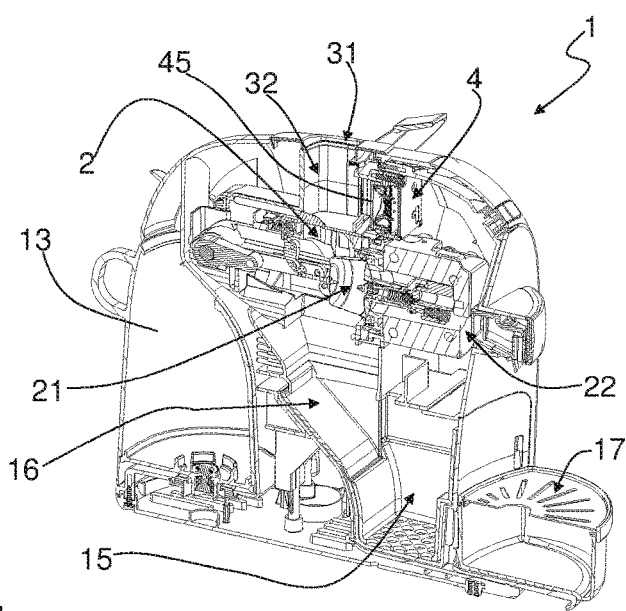
FIG. 2 is a perspective, longitudinal sectional view of the apparatus shown in FIG. 1.
Figure 3:
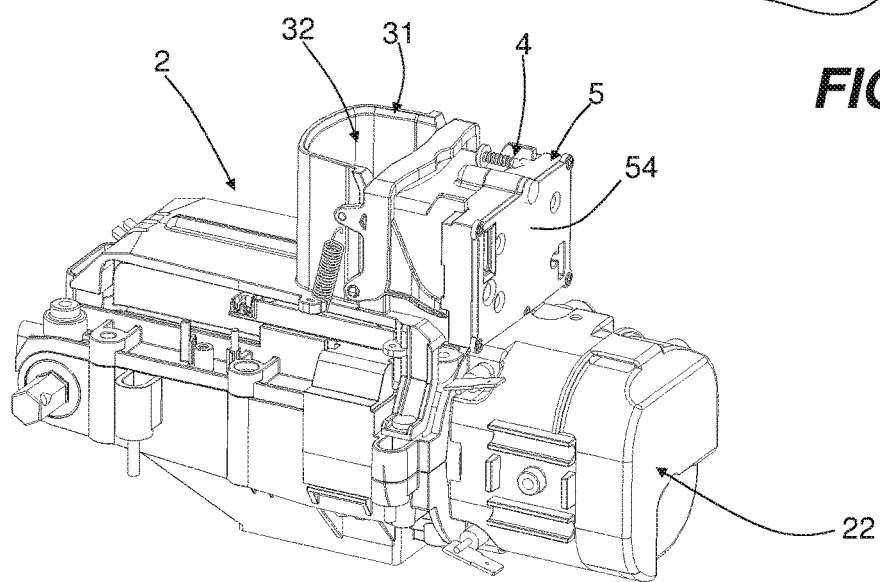
FIG. 3 is a perspective view of an inner unit of the apparatus shown in FIG. 1, with this inner unit shown alone and removed from the apparatus.
Figure 11:
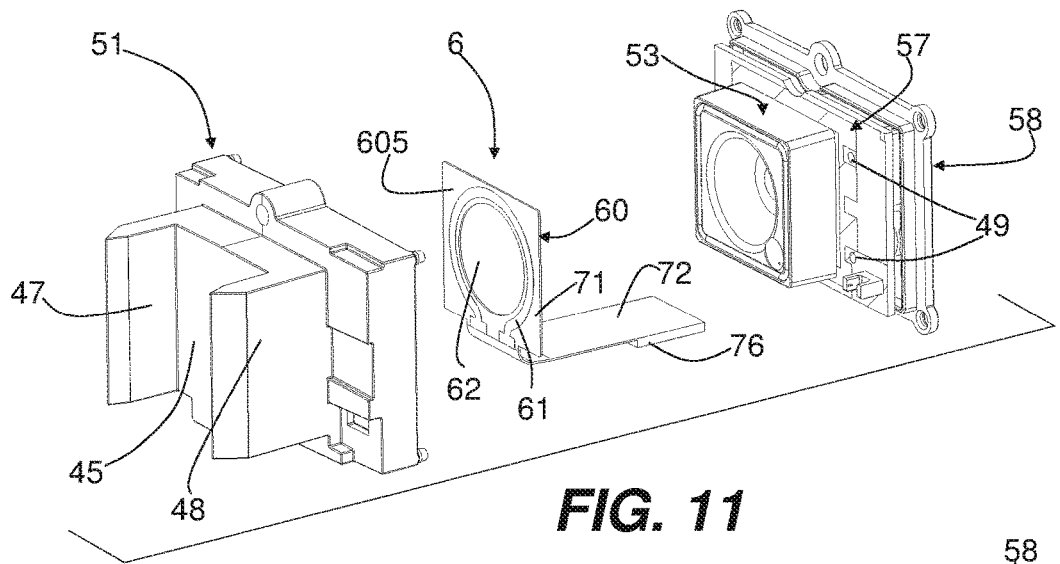
FIG. 11 is an exploded first view of the assembly shown in FIG. 5.
Figure 12:
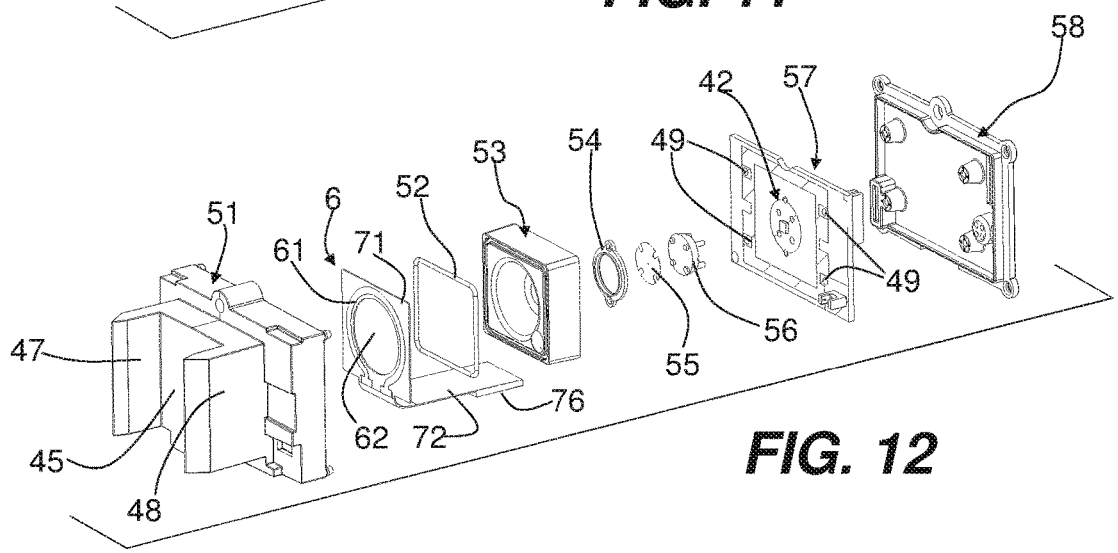
FIG. 12 is an exploded second view of the assembly shown in FIG. 5.

The infusion unit 2 comprises a first part 25 and a second part 26 which are movable, at least relative to each other, between a home position, where the infusion chamber 21 is open, and an infusion position, where the infusion chamber 21 is closed. When in the home position, the first part 25 and the second part 26 of the infusion unit 2 are spaced sufficiently apart from each other to allow a capsule to be inserted into the infusion chamber 21, whereas when in the infusion position (shown in FIGS. 2 and 4), the first part 25 and the second part 26 are coupled to one another to clamp the capsule in the infusion chamber 21. The movement of the first part 25 and the second part 26 between the home position and the infusion position, and vice versa, is driven manually by a user by means of a lever 14 pivoted to the frame of the apparatus 1. These aspects are already known in themselves and shall not be described further.

In the embodiment shown in the figures, the infusion unit 2 is horizontal in type: the first part 25 and the second part 26 are movable relative to one another according to a horizontal line of movement which is parallel to a central axis defined by the infusion chamber 21. Moreover, the infusion chamber 21 is advantageously made substantially entirely in only one of either the first part 25 or the second part 26 (specifically, in the second part 26), whilst the other part acts as an element for clamping the infusion chamber 21.

Specifically, the central axis of the capsule placed in the infusion chamber 21 is substantially horizontal and coinciding with the central axis of the infusion chamber 21.

For the placement of the capsule, the apparatus 1 comprises an insertion opening 31 and a transfer channel 32 which connects the insertion opening 31 to the infusion chamber 21. After being inserted into the apparatus 1 through the insertion opening 31, the capsule travels along the transfer channel 32 until it reaches a receiving seat between the first part 25 and the second part 26 of the infusion unit 2 in the home position.

In particular, the insertion opening 31 is a mouth at the top of the transfer channel 32 and faces upwards. As shown in the figures, the insertion opening 31 is located in the top region of the shell 10.

The transfer channel 32 substantially extends downwards (vertically or optionally inclined) and the capsule moves therein by force of gravity as it falls downwards. The transfer channel 32 may optionally be equipped with two guide grooves (not shown) that are located on opposing sides of the transfer channel 32 itself and extend parallel to the progression of the transfer channel 32. The guide grooves, which receive opposite portions of an annular flange projecting from the top of the capsule, serve to guide the capsule as it falls along the transfer channel 32 and to prevent the capsule from rotating on itself as it falls.

When the first part 25 and the second part 26 of the infusion unit 2 are in the home position, the bottom of the transfer channel 32 opens onto the receiving seat which is formed by the space interposed between the first part 25 and the second part 26. When the first part 25 and the second part 26 of the infusion unit 2 are in the infusion position, the bottom of the transfer channel 32 is closed off by a movable wall 27 that moves together with the second part 26.

The apparatus 1 can also comprise capsule-holding means (which can themselves be made in the known way) to hold the capsule in a standby position when the first part 25 and the second part 26 are in the home position and during at least part of their movement towards the infusion position, as well as capsule-ejecting means (which can also themselves be made in the known way) which cause the ejection of the capsule from the infusion chamber 21 at the end of dispensing, as the first part 25 and the second part 26 return to the home position.

The apparatus 1 further comprises a collection chamber 15 for used capsules: after being ejected from the infusion chamber 21 after use, the capsule falls into the collection chamber 15. The collection chamber 15 is located below the infusion chamber 21, substantially on the bottom of the apparatus 1, and is connected to the infusion chamber 21 by a fall channel 16. The collection chamber 15 is in communication, through the infusion chamber 21, with the transfer channel 32.

The collection chamber 15 is part, for instance, of a drawer that, being removable from the main body of the apparatus 1, allows periodic removal and disposal of used capsules. In particular, the removable drawer also comprises a support 17 for a cup which is intended to receive the beverage dispensed by the apparatus 1.

The apparatus 1 comprises an image acquisition device 4 which is intended to acquire at least one image of a portion of the capsule. Specifically the image acquisition device 4 is used to acquire one or more images of at least one identifying portion of the capsule, namely a portion featuring a bar code or other graphic element that is itself visible and recognisable. For example, this graphic element is formed by a word or figurative mark, preferably registered, thus allowing an information to the consumer that the capsule in question is compatible with the apparatus 1 and is approved by the manufacturer of the apparatus 1 itself.

In the embodiment illustrated, the image acquisition device 4 is associated with the transfer channel 32 and, when in use, acquires at least one image of a portion of the capsule before the latter reaches the infusion chamber 21. Indeed, the image acquisition device 4 is positioned along the capsule feeding path, outside of the infusion chamber 21. Therefore, the image acquisition device 4 is configured to acquire one or more images of the capsule when the latter is at an image capture zone 40 in which, in use, the capsule is located or passes. Specifically, the image capture zone 40 is a section of the transfer channel 32.

In an alternative embodiment, the image acquisition device 4 and the image capture zone 40 may be in another position, for instance the image acquisition device 4 may be positioned to acquire one or more images of the capsule when the latter is located in the infusion chamber 21.

The image acquisition device 4 firstly comprises at least one optical sensor 42 facing the image capture zone 40. The optical sensor 42 is, for instance, a sensor with CMOS technology and, in particular, operates at least in the visible light spectrum. The image acquisition device 4 also comprises at least one light-emitting element 49 to illuminate, in use, the image capture zone 40 and the capsule therein. The at least one light-emitting element 49 is formed, for instance, by one or more LEDs which produce white light.

The apparatus 1 comprises a viewing window 45, made of transparent material (for instance polymethylmethacrylate), which is interposed between the optical sensor 42 and the image capture zone 40. The viewing window 45 has a first face 451 facing the optical sensor 42 and a second face 452 facing the image capture zone 40. During use, the optical sensor 42 views the capsule in the image capture zone 40 through the viewing window 45. For instance, the viewing window 45 is a wall separating the optical sensor 42 from the image capture zone 40 in the transfer channel 32, to protect the optical sensor 42 from dirt or vapours coming from the transfer channel 32 itself.

The viewing window 45 has a central region 455, which is located on the optical path between the optical sensor 42 and the image capture zone 40, and a peripheral region 456 which is located around the central region 455. During use, the optical sensor 42 views the capsule in the image capture zone 40 through the central region 455, while the peripheral region 456 is substantially situated outside the viewing field of the optical sensor 42 or, in any case, is not relevant for correctly acquiring images of the capsule. For instance, the central region 455 has a circular disc shape, while the peripheral region 456 surrounds the central region 455 and has a substantially annular or crown shape. Specifically, the central region 455 is circular and has a diameter of approximately 20 mm.

In the embodiment illustrated, the image acquisition device 4 comprises a box-shaped casing 5, which encloses an inner chamber 50 in which the optical sensor 42 is housed. The viewing window 45 is a part of the box-shaped casing 5, being a front wall thereof. The box-shaped casing 5, the viewing window 45 and the image acquisition device 4 are parts of an assembly which is shown in FIGS. 5 to 12.

The box-shaped casing 5 further comprises side walls which are connected to the front wall and delimit the inner chamber 50 laterally. Optionally, the front wall and the side walls are made in one piece. The box-shaped casing 5 can further comprise a rear wall 58 which is on the side opposite side to the front wall and is therefore further away from the image capture zone 40. This rear wall 58 is a separate piece, for instance a panel fixed to the side walls, which closes the inner chamber 50 to the rear. The optical sensor 42, the light-emitting element 49 and any other electronic components of the image acquisition device 4 can be supported by or mounted on the rear wall 58.

To prevent moisture or dirt from entering the inner chamber 50, the box-shaped casing 5 is substantially hermetic.

In the embodiment illustrated, the box-shaped casing 5 of the image acquisition device 4 comprises two side walls 47, 48 which are light guides arranged on the sides of the viewing window 45 and which extend towards the image capture zone 40. The light-guide side walls 47, 48 are coupled to light-emitting elements 49 (in particular, LEDs) which are supported by the rear wall 58. The side walls 47, 48 are, as mentioned, light guides configured to internally transmit the light emitted by the light-emitting elements 49 to respective illuminating surface regions 471, 481. Therefore, in use, the image capture zone 40 is illuminated by light projected from the illuminating surface regions 471, 481 of the light-guide side walls 47, 48.

Specifically, the light-guide side walls 47, 48 and the front wall including the viewing window 45 are made in one piece. Said side walls are solid, that is, the material they are made of occupies their entire thickness. The material used is, for instance, polymethylmethacrylate. For further details on the light-guide side walls and the illuminating system, as well as for any possible alternative embodiments, reference shall be made to the description contained in Italian patent application No. 102017000060684, in the name of this same applicant, the content of which is incorporated herein by reference.

The apparatus 1 comprises an electronic processing unit capable of operating the image acquisition device 4 and processing the images obtained by the optical sensor 42.

In the embodiment illustrated, the image acquisition device 4 is located in a side seat 33 relative to the transfer channel 32. As shown in FIG. 4, the viewing window 45 is spaced apart from the transfer channel 32 and is situated in a back position in the side seat 33. As a result of this arrangement, the viewing window 45 is not directly brushed by moist air or water vapour rising in the transfer channel 32 from the infusion chamber 21 and/or from the collection chamber 15 for used capsules.

However, this arrangement may not be sufficient in itself to prevent the formation of water condensation and misting on the viewing window 45. To prevent or at least reduce this drawback, an apparatus 1 according to this invention further comprises a heating element 6 applied to the viewing window 45 or incorporated in the viewing window 45.

Namely, the heating element 6 can be mounted on one face of the viewing window 45 or can be inside the viewing window 45, for instance if the latter is formed by some layers of material.

The heating element 6 is an electrical resistor-type heater and is electrically connectable to an electricity supply (for example, it is connected to an electricity supply which also supplies the water heater 22 and the other electrical parts of the apparatus 1). The heating element 6 is intended for heating the viewing window 45 during use of the apparatus 1, thanks to the heating produced by Joule effect in the electrical resistor of the heating element 6 itself.

For instance, the heating element 6 is in contact with one of the faces of the viewing window 45, therefore the heat produced by the heating element 6 is efficiently transferred to the viewing window 45 by thermal conduction.

In particular, the heating element 6 is applied to the first face 451 of the viewing window 45, namely the face which is facing the optical sensor 42 and is opposite to the second face 452 being at a greater risk of water condensation and misting forming on it. In other words, the heating element 6 is situated on the side of the inner chamber 50 of the box-shaped casing 5 of the image acquisition device 4.

The heating element 6 comprises an electrical conductor 61 which forms a heating electrical resistor and which is positioned at the peripheral region 456 of the viewing window 45. Therefore, this electric conductor 61, which is not transparent, is outside the viewing field of the optical sensor 42 or, in any case, does not negatively interfere with the acquisition of images of the capsule in the image capture zone 40; namely, the electrical conductor 61 does not prevent the relevant parts of the image to be acquired from being viewed. This enables misting of the viewing window 45 to be avoided without compromising or disturbing the operation of the image acquisition device 4. In particular, the electrical conductor 61 substantially forms a ring which surrounds a central region 455 of the viewing window 45. This is useful both for leaving free the central region 455 of the viewing window 45 and for heating the central region 455 efficiently, as the heat propagates from substantially the entire periphery of the central region 455 towards its centre.

The electrical conductor 61 is, for instance, a wire or a metal strip or is made with a conductive ink distributed according to a suitable pattern on a supporting layer.

The heating element 6 can be made in different ways and structures. In one specific embodiment of this invention, the heating element 6 comprises a thin sheet 60 and an electrical conductor 61 forming the heating electrical resistor. The electrical conductor 61 is applied to the thin sheet 60 or is incorporated in the thin sheet 60. Basically, the thin sheet 60 acts as a support for the electrical conductor 61.

In order not to interfere with the image acquisition, the thin sheet 60 is made of a transparent material or has an opening 62 corresponding to the central region 455 of the viewing window 45. This opening 62 has, for instance, the same dimensions as the central region 455 (or larger dimensions) and therefore, as a material-less hole, it leaves the viewing field of the optical sensor 42 completely free. For instance, the electrical conductor 61 is positioned around the opening 62.

In particular, the thin sheet 60 comprises a first layer 601 made of plastic material and a second layer 602 made of plastic material. The electrical conductor 61 is enclosed between the first layer 601 and the second layer 602, thus being incorporated into the thin sheet 60 that electrically insulates it and protects it from damage. The plastic material is, for instance, polyethylene terephthalate (PET). For instance, the first layer 601 has a thickness of 190 µm and the second layer 602 has a thickness of 75 µm. The layers 601, 602 are, for instance, portions of sheets of plastic material, in particular transparent plastic material.

In an alternative embodiment, the electrical conductor 61 can be applied on one of the faces of the thin sheet 60 instead of being incorporated inside it. For instance, the electrical conductor 61 is made with a conductive ink, in particular ink with silver particles. During manufacturing, the conductive ink is distributed onto a first of the two layers 601, 602 according to the desired path for the electrical conductor 61; subsequently, the second of the two layers 601, 602 is superimposed over the first layer and fixed to enclose the conductive ink between the two layers.

Figures 13, 14, 15:
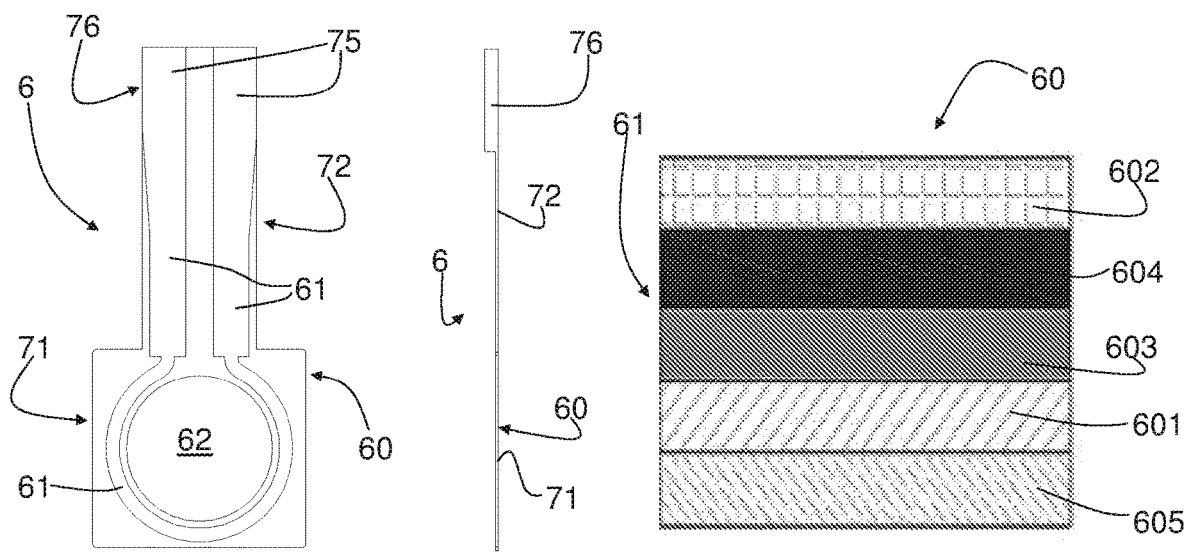
FIG. 13 is a front view of a heating element forming part of the assembly shown in FIG. 5, the heating element being shown developed along one plane.
FIG. 14 is a side view of the heating element shown in FIG. 13, developed along one plane.
FIG. 15 is a sectional view of a portion of the heating element shown in FIG. 13.

In the sectional view in FIG. 15, the electrical conductor 61 in the heating region of the thin sheet 60 is in turn made of two layers, which are a first layer 603 of conductive ink and a second layer 604 of heating ink which is electrically connected to the first layer 603.

The thin sheet 60 is applied to the viewing window 45 or is incorporated in the viewing window 45.

In particular, one face of the thin sheet 60 has an adhesive layer 605 by means of which the thin sheet 60 is fixed to the viewing window 45. The adhesive layer 605 can also be transparent.

According to the embodiment illustrated, the heating element 6 comprises a first portion 71, which includes the thin sheet 60 and is parallel to the viewing window 45, and a second portion 72, which forms an extension of the first portion 71 and extends away from the viewing window 45.

Specifically, the first portion 71 and the second portion 72 are parts of a single body of plastic material, preferably made with the layers 601, 602 mentioned above. The heating element 6 is flexible and can be folded along a hinge line between the first portion 71 and the second portion 72 without damaging the electrical conductor 61.

The electrical conductor 61 extends in the first portion 71, where it forms the heating electrical resistor, and in the second portion 72, where it forms electrical contacts 75 for connection to the electricity supply. The electrical contacts 75 are exposed, that is, they are not covered by plastic material, to allow the electrical connection to be made easily and, moreover, they are situated in a part 76 which is thicker and more rigid than the second portion 72. This thicker part 76 is, for instance, made of polycarbonate and is useful for facilitating the insertion of the electrical contacts 75 into a corresponding socket (not shown) and their holding in the socket itself.

The electrical conductor 61 has a passage cross-section which in the first portion 71 is less than the passage cross-section of the electrical conductor 61 in the second portion 72. FIG. 13 shows that the width of the electrical conductor 61 in the first portion 71 is less than the width of the electrical conductor 61 in the second portion 72. For instance, the width of the electrical conductor 61 is 1.5 mm in the first portion 71 and 5 mm in the second portion 72.

As a result of the different passage cross-sections, the electrical resistance of the electrical conductor 61 is larger in the first portion 71 and is smaller in the second portion 72. Consequently, in use, an heating by Joule effect mainly occurs in the first portion 71, where it is required to heat the viewing window 45, and is negligible in the second portion 72, where it merely constitutes energy loss.

In the embodiment illustrated, the image acquisition device 4 comprises: a front part 51 of the box-shaped casing 5, the front part 51 in turn including the viewing window 45 and the light-guide side walls 47, 48; a front lid 53 for the optical sensor 42, the front lid 53 being housed within an inner seat of the front part 51; the heating element 6, the first portion 71 of which is arranged in the inner seat between the viewing window 45 and the front lid 53; a first gasket 52, between the first portion 71 of the heating element 6 and the front lid 53; a second gasket 54; a diaphragm 55; a lens 56; a printed circuit board 57, on which the optical sensor 42 and the light-emitting elements 49 are mounted; the rear wall 58, which closes the box-shaped casing 5 and supports the printed circuit board 57. The second gasket 54, the diaphragm 55 and the lens 56 are enclosed between the front lid 53 and the printed circuit board 57. The rear wall 58 is fixed to the front part 51 of the box-shaped casing 5.

One example of a heating element 6 has the following dimensions. The first portion 71 of the heating element 6 has an approximately square shape, with a side of 30 mm, and the electrical conductor 61 is situated around a circular central area with a diameter of 22 mm, in which there is the opening 62 which is circular and with a diameter of 20.5 mm. The second portion 72 of the heating element 6 has a width of 16 mm and a length of 42 mm. The heating element 6 has a thickness of approximately 0.4 mm; the region where the electrical contacts 75 are located has a length of 14.5 mm and a thickness greater than the rest of the heating element 6, for instance a thickness of 1.5 mm.

The heating element 6 operates with an electrical voltage of 230 V and has a power of 1.07 W. Its maximum operating temperature is 90° C. Power density is 0.85 W/cm$^2$.

The first portion 71 of the heating element 6 is fixed by the adhesive layer 605 to the first face 451 of the viewing window 45. The second portion 72 is bent at around a 90° angle relative to the first portion 71 and protrudes backwards relative to the rear wall 58, so that the electrical contacts 75 are easily connectable to the electricity supply. It should be noted that the second portion 72 is not shown in FIGS. 5 to 8, but FIG. 6 shows an opening 581 through which the second portion 72 protrudes and projects from the rear wall 58.

As mentioned, the heating element 6 is connected to an electricity supply. During the use of the apparatus 1, the electrical current passing through the electrical conductor 61 produces heating by Joule effect, which is transferred by thermal conduction to the viewing window 45. Consequently, the latter is heated to a higher temperature than the air dew temperature in the transfer channel 32 and water condensation is prevented from forming thereon.

For further details on known aspects of the apparatus 1, reference shall be made, for instance, to the description contained in patent applications WO 2015/019248 A1, WO 2015/019249 A1 and WO 2017/134544 A1, in the name of this same applicant, the content of which is incorporated herein by reference.

Many modifications and variations can be made to the invention as designed herein without departing from the scope of the accompanying claims.

All details can be replaced by other technically equivalent details and any materials, shapes and dimensions of the various components may be used according to requirements.

The invention claimed is:

1. An apparatus (1) for making a beverage, comprising:
an infusion chamber (21) suitable for receiving a capsule containing a food substance for making a beverage;
an insertion opening (31) for inserting the capsule into the apparatus (1);
a transfer channel (32) for the capsule, which connects the insertion opening (31) to the infusion chamber (21);
an image acquisition device (4) which is intended, in use, to acquire at least one image of a portion of the capsule, the image acquisition device (4) including an optical sensor (42) facing an image capture zone (40) in which, in use, said capsule is located or passes;
a viewing window (45), made of transparent material, which is interposed between the optical sensor (42) and the image capture zone (40), the viewing window (45) having a first face (451) facing the optical sensor (42) and a second face (452) facing the image capture zone (40);
a heating element (6) applied to the viewing window (45) or incorporated in the viewing window (45), wherein the heating element (6) is an electrical resistor-type heater and is electrically connectable to an electricity supply, the heating element (6) being intended for heating the viewing window (45) during use of the apparatus (1), wherein the viewing window (45) has a central region (455), which is located on the optical path between the optical sensor (42) and the image capture zone (40), and a peripheral region (456) which is located around the central region (455); wherein the heating element (6) comprises an electrical conductor (61) which forms a heating electrical resistor and which is positioned at the peripheral region (456) of the viewing window (45).

2. The apparatus (1) for making a beverage according to claim 1, wherein the heating element (6) is applied to the first face (451) of the viewing window (45).

3. The apparatus (1) for making a beverage according to claim 1, wherein the electrical conductor (61) forms a ring which surrounds the central region (455) of the viewing window (45).

4. An apparatus (1) for making a beverage, comprising:
an infusion chamber (21) suitable for receiving a capsule containing a food substance for making a beverage;
an insertion opening (31) for inserting the capsule into the apparatus (1);
a transfer channel (32) for the capsule, which connects the insertion opening (31) to the infusion chamber (21);
an image acquisition device (4) which is intended, in use, to acquire at least one image of a portion of the capsule, the image acquisition device (4) including an optical sensor (42) facing an image capture zone (40) in which, in use, said capsule is located or passes;
a viewing window (45), made of transparent material, which is interposed between the optical sensor (42) and the image capture zone (40), the viewing window (45) having a first face (451) facing the optical sensor (42) and a second face (452) facing the image capture zone (40);
a heating element (6) applied to the viewing window (45) or incorporated in the viewing window (45), wherein the heating element (6) is an electrical resistor-type heater and is electrically connectable to an electricity supply, the heating element (6) being intended for heating the viewing window (45) during use of the apparatus (1),
wherein the heating element (6) comprises a thin sheet (60) and an electrical conductor (61) which forms a heating electrical resistor,
the electrical conductor (61) being applied to the thin sheet (60) or incorporated in the thin sheet (60),
the thin sheet (60) being applied to the viewing window (45) or incorporated in the viewing window (45).

5. The apparatus (1) for making a beverage according to claim 4, wherein the viewing window (45) has a central region (455), which is located on the optical path between the optical sensor (42) and the image capture zone (40), and a peripheral region (456) which is located around the central region (455);
wherein the heating element (6) comprises an electrical conductor (61) which forms a heating electrical resistor and which is positioned at the peripheral region (456) of the viewing window (45);
the thin sheet (60) having an opening (62) corresponding to the central region (455) of the viewing window (45).

6. The apparatus (1) for making a beverage according to claim 4, wherein the electrical conductor (61) is made with a conductive ink.

7. The apparatus (1) for making a beverage according to claim 4, wherein the thin sheet (60) comprises a first layer (601) made of plastic material and a second layer (602) made of plastic material, the electrical conductor (61) being enclosed between the first layer (601) and the second layer (602).

8. The apparatus (1) for making a beverage according to claim 4, wherein one face of the thin sheet (60) has an adhesive layer (605), the thin sheet (60) being fixed to the viewing window (45) by means of the adhesive layer (605).

9. The apparatus (1) for making a beverage according to claim 4, wherein the heating element (6) comprises a first portion (71), which includes the thin sheet (60) and is parallel to the viewing window (45), and a second portion (72), which forms an extension of the first portion (71) and extends away from the viewing window (45), the electrical conductor (61) extending in the first portion (71), where it forms the heating electrical resistor, and in the second portion (72), where it forms electrical contacts (75) for connection to the electricity supply.

10. The apparatus (1) for making a beverage according to claim 9, wherein the electrical conductor (61) has a passage cross-section which in the first portion (71) is less than the passage cross-section in the second portion (72), so that in use a heating by Joule effect mainly occurs in the first portion (71).

11. The apparatus (1) for making a beverage according to claim 4, wherein the heating element (6) is applied to the first face (451) of the viewing window (45).

12. The apparatus (1) for making a beverage according to claim 4,
wherein the viewing window (45) has a central region (455), which is located on the optical path between the optical sensor (42) and the image capture zone (40), and a peripheral region (456) which is located around the central region (455);
wherein the heating element (6) comprises an electrical conductor (61) which forms a heating electrical resistor and which is positioned at the peripheral region (456) of the viewing window (45).

13. The apparatus (1) for making a beverage according to claim 12, wherein the electrical conductor (61) forms a ring which surrounds the central region (455) of the viewing window (45).

* * * * *